(12) United States Patent
Pourmousavi Kani et al.

(10) Patent No.: US 10,298,042 B2
(45) Date of Patent: May 21, 2019

(54) RESILIENT BATTERY CHARGING STRATEGIES TO REDUCE BATTERY DEGRADATION AND SELF-DISCHARGING

(71) Applicant: NEC Laboratories America, Inc., Princeton, NJ (US)

(72) Inventors: Seyyed Ali Pourmousavi Kani, San Jose, CA (US); Babak Asghari, San Jose, CA (US); Ratnesh Sharma, Fremont, CA (US)

(73) Assignee: NEC Corporation, Tokyo (JP)

( * ) Notice: Subject to any disclaimer, the term of this patent is extended or adjusted under 35 U.S.C. 154(b) by 73 days.

(21) Appl. No.: 15/363,876

(22) Filed: Nov. 29, 2016

(65) Prior Publication Data
US 2017/0229881 A1   Aug. 10, 2017

Related U.S. Application Data

(60) Provisional application No. 62/291,639, filed on Feb. 5, 2016.

(51) Int. Cl.
*H02J 7/00* (2006.01)
*H01M 10/44* (2006.01)
*H02J 3/32* (2006.01)
*H02J 3/38* (2006.01)

(52) U.S. Cl.
CPC .......... *H02J 7/0068* (2013.01); *H01M 10/44* (2013.01); *H02J 3/32* (2013.01); *H02J 3/382* (2013.01); *H02J 7/0057* (2013.01); *Y02E 70/30* (2013.01)

(58) Field of Classification Search
CPC ............................. H02J 7/0068; H02J 7/0057
USPC ........................................... 320/137
See application file for complete search history.

(56) References Cited

U.S. PATENT DOCUMENTS

| 7,969,120 B2* | 6/2011 | Plett | G01R 31/3648 320/145 |
| 9,912,017 B1* | 3/2018 | Kuo | H01M 10/46 |
| 2014/0039710 A1* | 2/2014 | Carter | G06Q 10/06 700/291 |

OTHER PUBLICATIONS

Eom, et al., "Economic Dispatch Algorithm Considering Battery Degradation Characteristic of Energy Storage System with PV System", 2014 17th International Conference on Electrical Machines and Systems (ICEMS),Oct. 2014, pp. 849-854.

* cited by examiner

*Primary Examiner* — Suchin Parihar
(74) *Attorney, Agent, or Firm* — Joseph Kolodka

(57) ABSTRACT

Computer-implemented methods and, a system are provided. A method includes constructing by an Energy Management System (EMS), one or more optimization-based techniques for resilient battery charging based on an optimization problem having an EMS cost-based objective function. The one or more optimization-based techniques are constructed to include a battery degradation metric in the optimization problem. The method further includes charging, by the EMS, one or more batteries in a power system in accordance with the one or more optimization-based techniques.

18 Claims, 5 Drawing Sheets

RESILIENT BATTERY CHARGING STRATEGIES TO REDUCE BATTERY DEGRADATION AND SELF-DISCHARGING

RELATED APPLICATION INFORMATION

This application claims priority to U.S. Provisional Pat. App. Ser. No. 62/291,639 filed on Feb. 5, 2016, incorporated herein by reference in its entirety.

BACKGROUND

Technical Field

The present invention relates to battery supplies and more particularly to resilient battery charging strategies to reduce battery degradation and self-discharging.

Description of the Related Art

It is well-known that battery capacity degrades with charge and discharge activities. Typically, discharge events are forced by the condition of the system. However, in many circumstances, battery charging can be delayed or shifted in time. Typically, battery round-trip efficiency is considered in a battery optimal operation algorithm. However, the, battery optimal operation algorithm does not have appropriate mechanisms in place to reduce battery idle time in high state of charge (SOC) conditions. Additionally, there is no provision for slow charging, if enough time is available, where the battery is charged with a lower charge rate for a longer period of time. Existing energy management systems usually minimize the operational cost, where battery degradation is not directly involved. Thus, the resultant battery charge/discharge profile, is not optimized for minimum battery degradation. Additionally, these algorithms do not consider uncertainty in battery charging events in the decision making process. Thus, there is a need for improved battery charging strategies.

SUMMARY

According to an aspect of the present invention, a computer-implemented method is provided. The method includes constructing, by an Energy Management System (EMS), one or more optimization-based techniques for resilient battery charging based on an optimization problem having an EMS cost-based objective function. The one or more optimization-based techniques are constructed to include a battery degradation metric in the optimization problem. The method further includes charging, by the EMS, one or more batteries in a power system in accordance with the one or more optimization-based techniques.

According to another aspect of the present invention, a computer-implemented method is provided. The method includes constructing, by an Energy Management System (EMS), one or more post-processing-based techniques for resilient battery charging. The one or more post-processing-based techniques are constructed to modify an existing EMS battery profile for a given battery under management by the EMS. The method further includes charging, by the EMS, one or more batteries in a power system in accordance with the one or more optimization-based techniques.

According to yet another aspect of the present invention, a system is provided. The system includes an Energy Management System (EMS), having a processor and a memory operable coupled to the processor. The EMS is configured to construct one or more optimization-based techniques for resilient battery charging based on an optimization problem having an EMS cost-based objective function. The one or more optimization-based techniques are constructed to include a battery degradation metric in the optimization problem. The EMS is further configured to charge one or more batteries in a power system in accordance with the one or more optimization-based techniques.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to resilient battery charging strategies to reduce battery degradation and self-discharging, In an embodiment, a resilient t, degradation/self-discharge-aware) battery charging method and system are provided. The present invention improves resilience battery operation to prevent damage to the battery by lowering battery degradation (both cyclic and calendar aging). Moreover, the present invention provides a more economic operation by towering self-discharge in consideration of the uncertainty in battery charging events.

In an embodiment, the present invention provides a technique for battery resilient charging where battery degradation and self-discharging is considered in the decision-making procedure. Based on the available resources, battery will be charged as late as possible in order to reduce calendar aging and self-discharging, but not too late to lose any possible battery charging opportunity. Additionally, the impact of battery charge rate will be considered on battery charge command to reduce battery degradation. By reducing battery degradation, more resilient battery operation with respect to battery charging event will be achieved.

The present invention optimizes battery charging by accounting for aging and self-discharge. The present invention can extend battery life which consequently decreases the operational cost of the energy system in the long-term. The present invention further improves battery resilient operation by extending battery life and preventing damage to the battery.

In an embodiment, the present invention finds future charging opportunities and estimates the amount of charge available to shift a battery charging period, to reduce idle time after charging (causing less calendar aging), to decrease charging rates in order to reduce cyclic aging.

In an embodiment, the present invention estimates the confidence interval of the forecasted values in order to account for uncertainty in battery charging.

Figure 1:
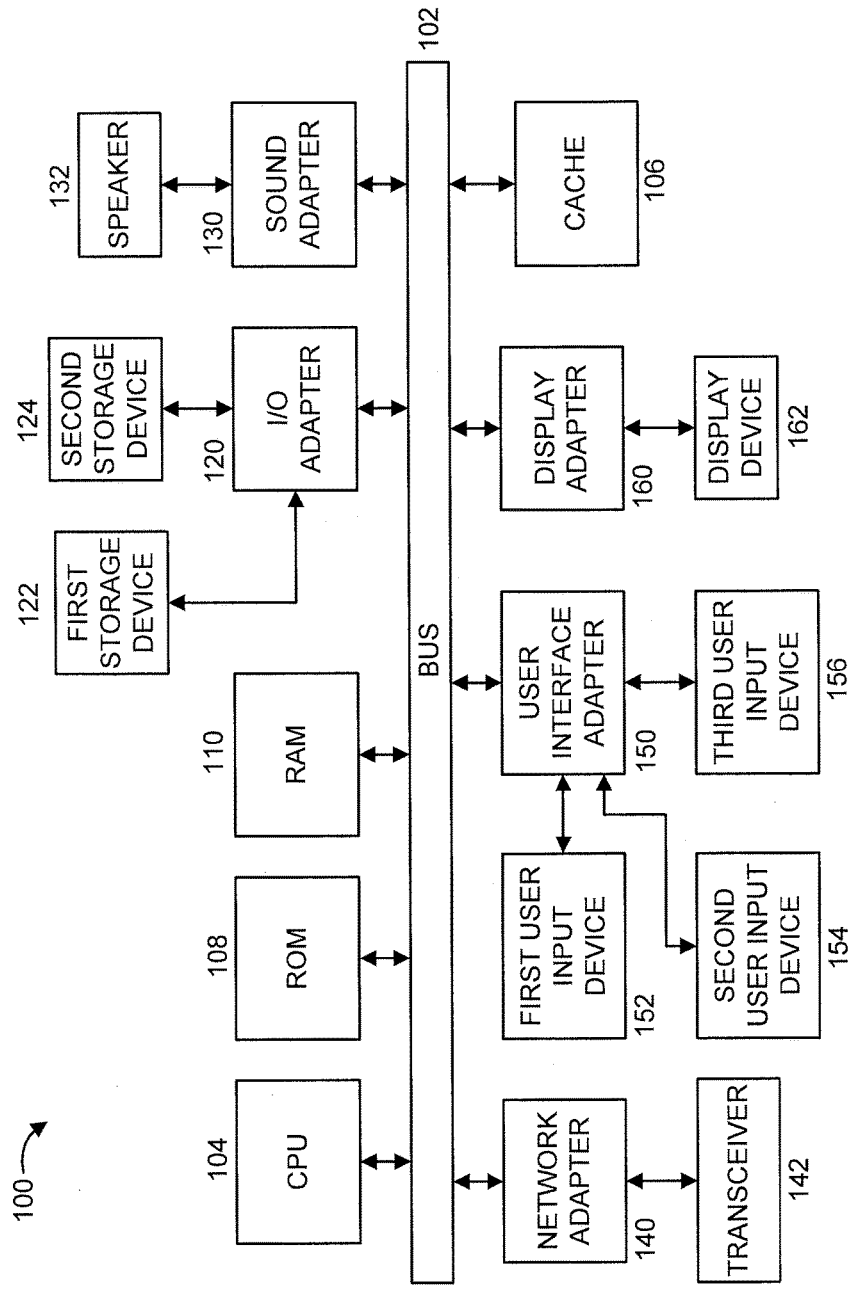
FIG. 1 shows a block diagram of an exemplary processing system 100 to which the present invention may be applied, in accordance with an embodiment of the present invention.

FIG. 1 shows a block diagram of an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. The speaker 132 can be used to provide an audible alarm or some other indication relating to resilient battery charging in accordance with the present invention. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
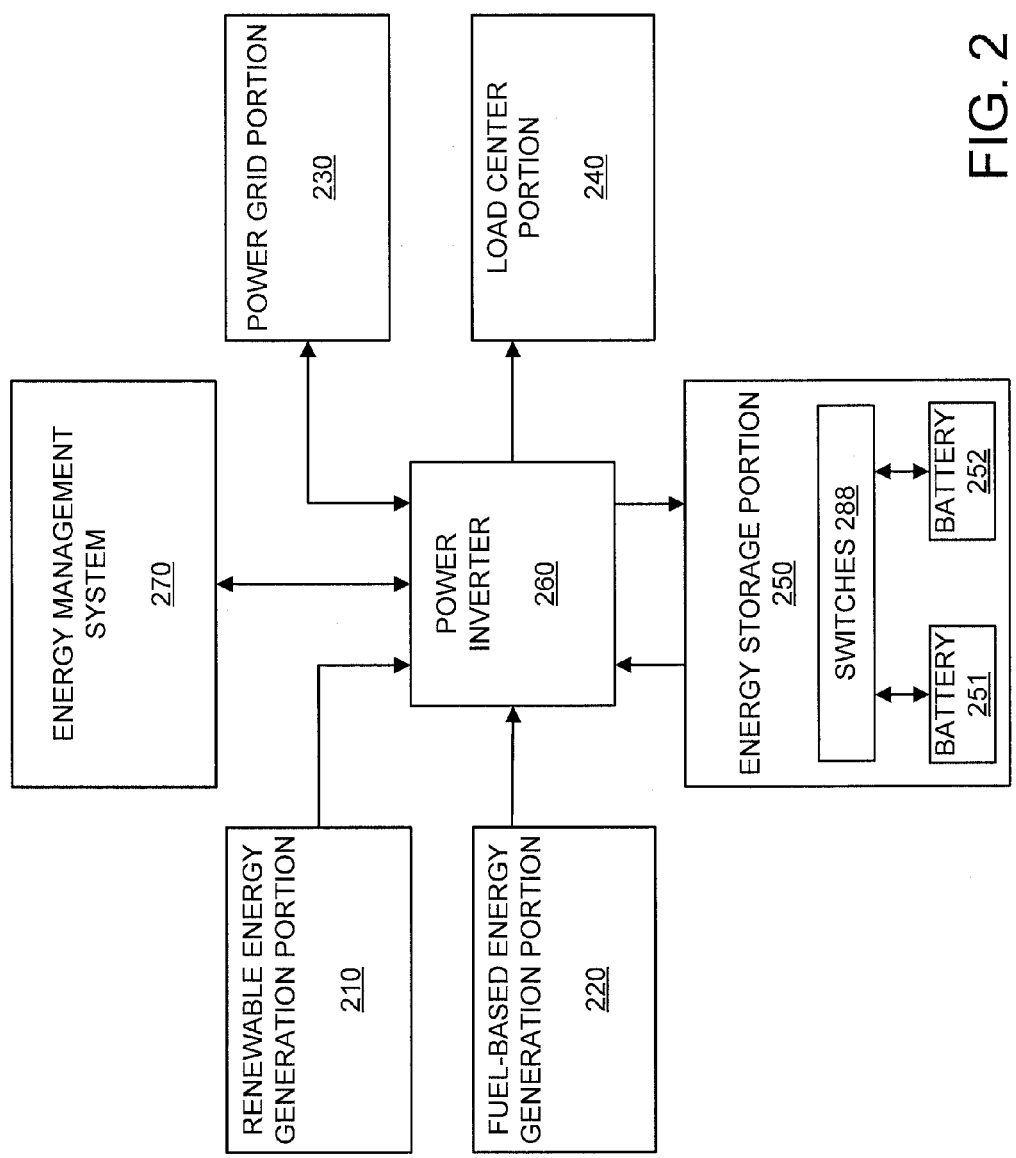
FIG. 2 shows a block diagram of an exemplary environment 200 to which the present invention can be applied, in accordance with an embodiment of the present invention.

Moreover, it is to be appreciated that environment 200 described below with respect to FIG. 2 is an environment for implementing respective embodiments of the present invention. Part or all of processing system 100 may be implemented in one or more of the elements of environment 200.

Figure 3:
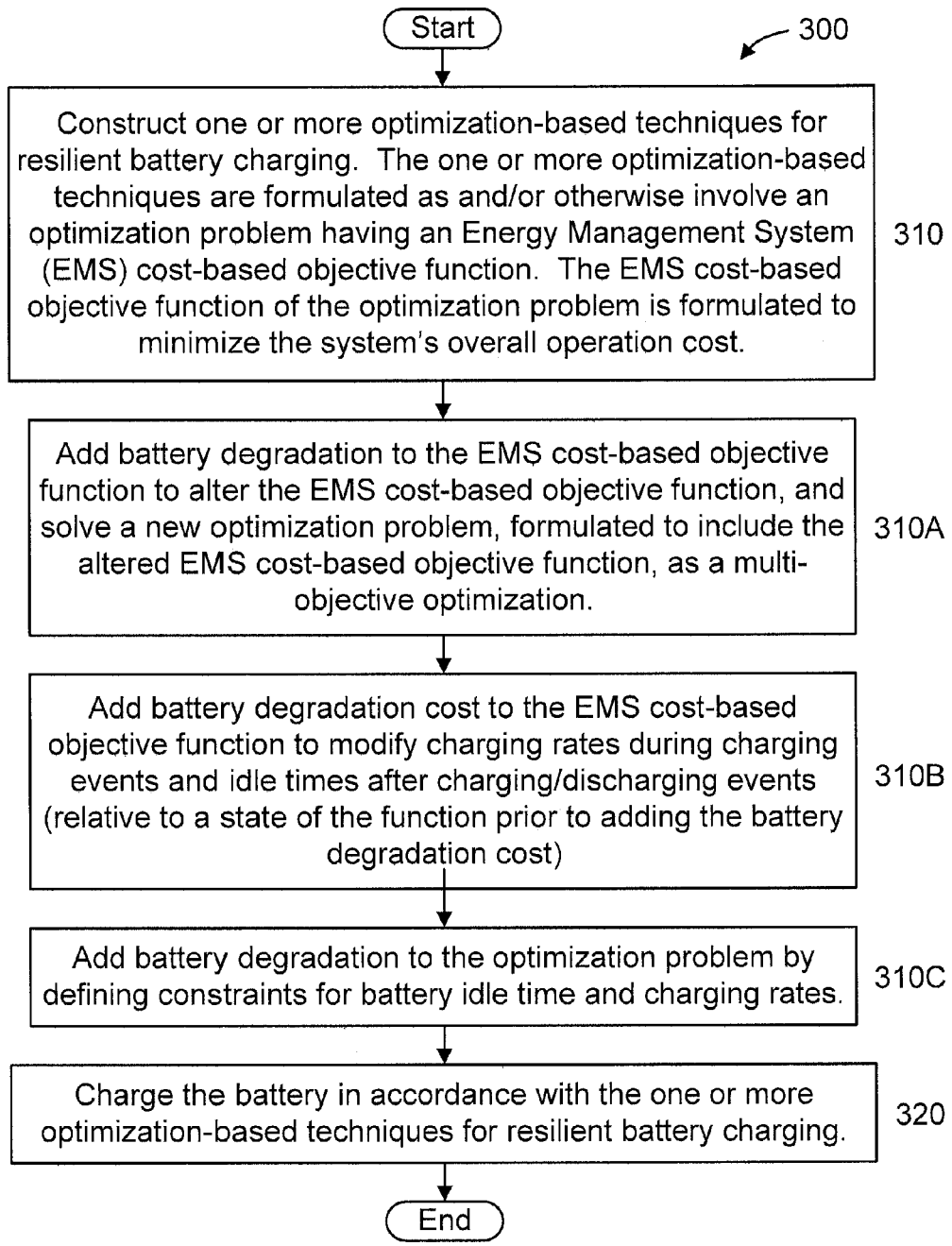
FIG. 3 shows a flow diagram of an exemplary method 300 for resilient battery charging to reduce battery cyclic and calendar aging, in accordance with an embodiment of the present invention.
Figure 4:
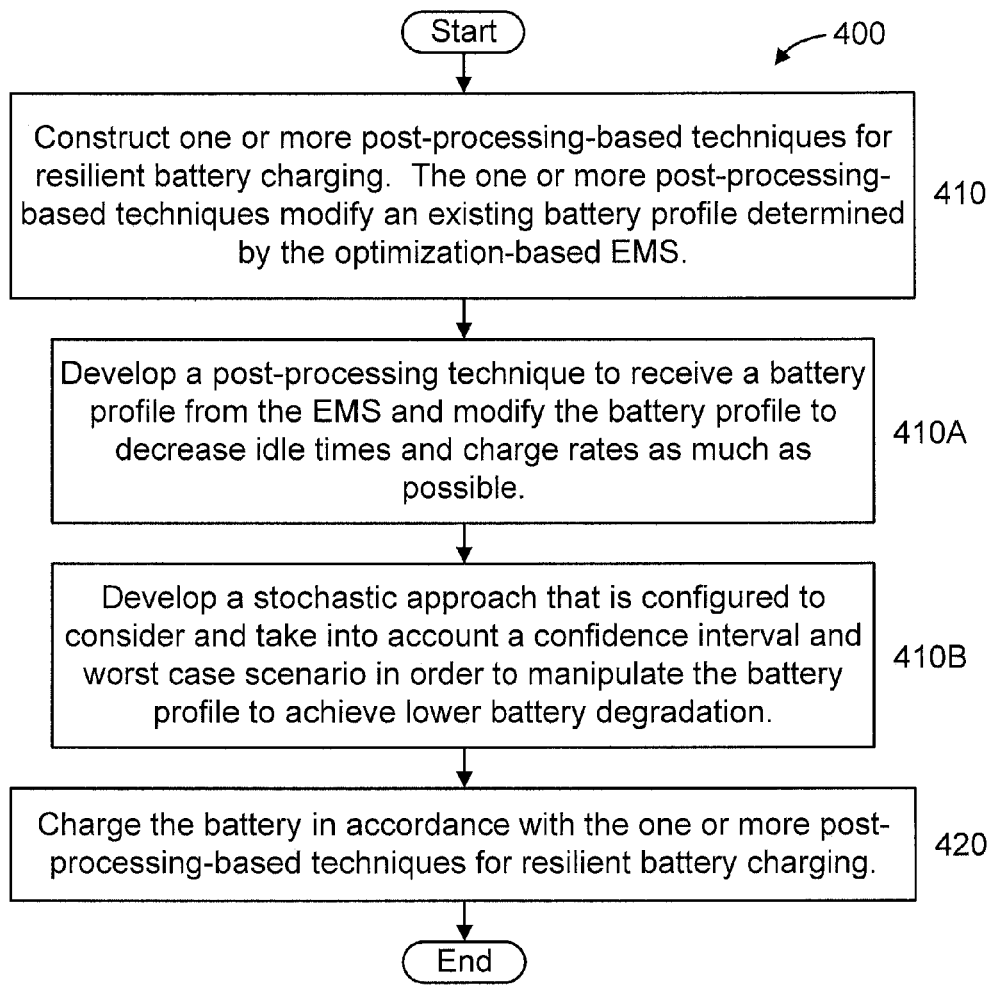
FIG. 4 shows a flow diagram of another exemplary method 400 for resilient battery charging to reduce battery cyclic and calendar aging, in accordance with an embodiment of the present invention.
Figure 5:
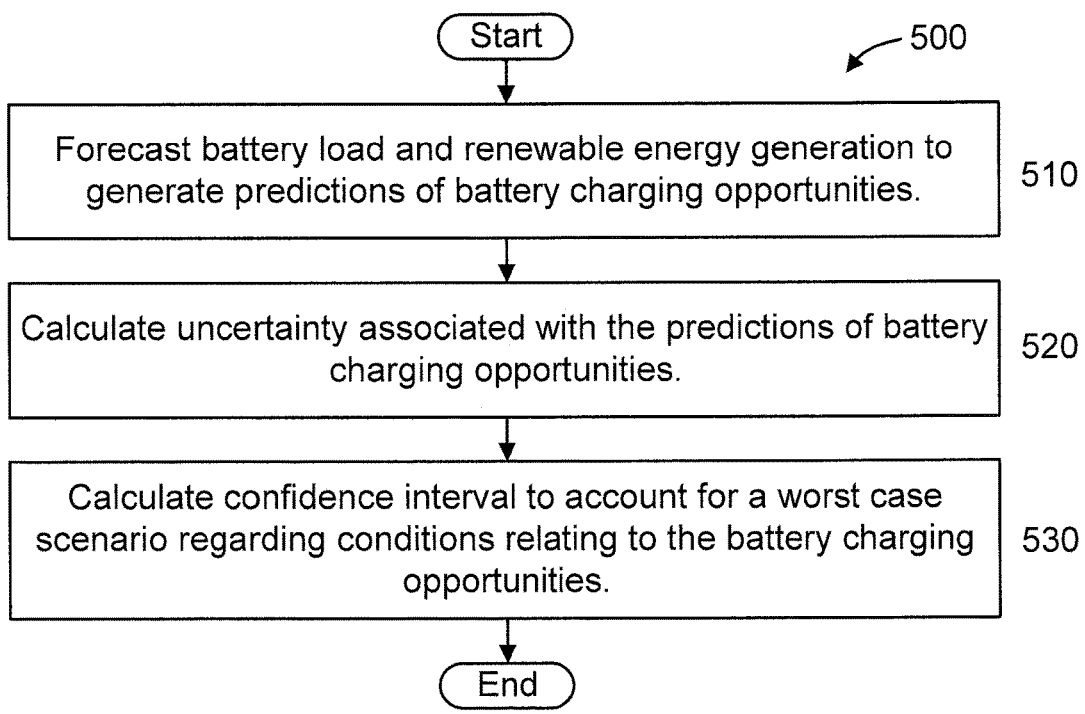
FIG. 5 shows a flow diagram of yet another exemplary method 500 for resilient battery charging to reduce battery cyclic and calendar aging, in accordance with an embodiment of the present invention.

Further, it is to be appreciated that processing system 100 may perform at least part of the method described herein including, for example, at least part of method 300 of FIG. 3 and/or at least part of method 400 of FIG. 4 and/or at least part of method 500 of FIG. 5. Similarly, part or all of system 200 may be used to perform at least part of method 300 of FIG. 3 and/or at least part of method 400 of FIG. 4 and/or at least part of method 500 of FIG. 5.

FIG. 2 shows a block diagram of an exemplary environment 200 to which the present invention can be applied, in accordance with an embodiment of the present invention.

The environment 200 includes a renewable energy generation portion 210, a fuel-based energy generation portion 220, a power grid portion 210, a load center portion 240, an energy storage portion 250, an inverter 260, and an Energy Management System (EMS) 270.

The renewable energy generation portion 210 can include, for example, but is not limited to, wind-based power generators, solar-based power generators, and so forth.

The fuel-based energy generation portion 220 can include, for example, but is not limited to, generators powered by fuel (gasoline, propane, etc.), and so forth.

The power grid portion 230 provides the structure for conveying power (e.g., to local and/or remote locations).

The load center 240 is a consumer of the power and can be a facility, a region, and/or any entity that provides a load for the power.

The energy storage portion 250 can include one or more energy storage devices such as batteries that can be modeled in accordance with the present principles. Batteries are typically employed in a MicroGrid (MG) or in power system for frequency regulation, demand response, time-of-use (ToU) and demand charge management, load shifting, and so on. As it is shown in FIG. 2, an energy storage device can either be charged or discharged in the power system. Battery degradation is directly affected by its charge/discharge profile and the time which the battery is idle.

Hardware-based switches 288 can be used to switch from, one battery 251 to another battery 252 depending upon and responsive to the approaches for battery charging in accordance with the present principles.

The inverter 260 performs Direct Current (DC) to Alternating Current (AC) conversion or vice Vera.

The Energy Management System (EMS) 270 determines the batteries 251 and 252 charge/discharge profile in accordance with one or more of the resilient battery charging techniques described herein.

FIG. 3 shows, a flow diagram of an exemplary method 300 for resilient battery charging to reduce battery cyclic and calendar aging, in accordance with an embodiment of the present invention.

At step 310, construct one or more optimization-based techniques for resilient battery charging. The one or more optimization-based techniques are formulated as and/or otherwise involve an optimization problem having an Energy Management System (EMS) cost-based objective function. The EMS cost-based objective function of the optimization problem is formulated to minimize the system's overall operation cost. In an embodiment, the optimization-based techniques are incorporated within, and performed by, an EMS unit.

In an embodiment, step 310 can include one or more of steps 310A, 310B, and 310C. As used with respect to any of steps 310A, 310B, and/or 310C, the term "battery degradation" refers to cyclic and/or calendar aging of a battery, and the term "battery degradation cost" refers to the cost associated with cyclic and/or calendar aging of a battery.

At step 310A, add battery degradation to the EMS cost-based objective function to alter the EMS cost-based objective function, and solve a new optimization problem, formulated to include the altered EMS cost-based objective function, as a multi-objective optimization. In an embodiment, the battery degradation can be added as an additional (e,g., second) objective function to the EMS cost-based objective function to alter the EMS cost-based objective function.

At step 310B, add battery degradation cost to the EMS cost-based objective function to modify charging rates during charging events and idle times after charging/discharging events (relative to a state of the function prior to adding the battery degradation cost). In an embodiment, a battery degradation function is converted into a cost function and added to the existing EMS cost-based objective function in the optimization problem.

At step 310C, add battery degradation to the optimization problem by defining constraints for battery idle time and charging rates. In an embodiment, the constraints are defined in order to decrease battery degradation to a minimum without changing the current objective function in the EMS cost-based objective function.

At step 320, charge the battery in accordance with the one or more optimization-based techniques for resilient battery charging.

FIG. 4 shows a flow diagram of another exemplary method 400 for resilient battery charging to reduce battery cyclic and calendar aging, in accordance with an embodiment of the present invention. In method 400, the optimization results for the battery can be modified/refined according to charging events and battery idle time in order to reduce battery degradation.

At step 410, construct one or more post-processing-based techniques for resilient battery charging. The one or ore post-processing-based techniques modify an existing battery profile determined by the optimization-based EMS.

In an embodiment, step 410 includes steps 410A and 410B.

At step 410A, develop a post-processing technique to receive a battery profile from the EMS and modify the battery profile to decrease idle times and charge rates as much as possible. In an embodiment, the received battery profile is mined in order to generate one or more predictions of battery charging opportunities for decreasing battery idle time and charging rates.

At step 410B, develop a stochastic approach that is configured to consider and take into account a confidence interval and worst case scenario in order to manipulate the battery profile to achieve lower battery degradation.

At step 420, charge the battery in accordance with the one or more post-processing-based techniques for resilient battery charging.

FIG. 5 shows a flow diagram of yet another exemplary method 500 for resilient battery charging to reduce battery cyclic and calendar aging, in accordance with an embodiment of the present invention. In an embodiment, step 410A of FIG. 4 can be implemented by at least a portion of method 500 of FIG. 5.

At step 510, forecast battery load and renewable energy generation to generate predictions of battery charging opportunities.

At step 520, calculate uncertainty associated with the predictions of battery charging opportunities.

At step 530, calculate confidence interval to account for a worst case scenario regarding conditions relating to the battery charging opportunities.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing, in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C; only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method, comprising:
   constructing, by an Energy Management System (EMS), one or more post-processing-based techniques for resilient battery charging, the one or more post-processing-based techniques being constructed to modify an existing EMS battery profile for a given battery under management by the EMS, wherein one of the one or more post-processing-based techniques includes formulating a stochastic approach based on a confidence interval and worst case scenario for the resilient battery charging to manipulate the existing EMS battery profile to achieve a lower amount of battery degradation of the given battery; and
   charging, by the EMS, one or more batteries in a power system in accordance with the one or more optimization-based techniques.

2. The computer implement method of claim 1, wherein the EMS existing battery profile is modified to decrease battery idle times and battery charge rates for the given battery.

3. The computer-implemented method of claim 1, further comprising mining the existing EMS battery profile to generate one or more predictions of battery charging opportunities for decreasing battery idle times and battery charging rates.

4. The computer-implemented method of claim 1, wherein the confidence interval is determined based on statistically-possible scenarios, including the worst case scenario.

5. The computer-implemented method of claim 1, further comprising:
   forecasting load demand and renewable energy generation to generate predictions of battery charging opportunities;
   calculating any uncertainties associated with the predictions of battery charging opportunities; and
   calculating a confidence interval to account for a worst case scenario regarding conditions relating to the battery charging opportunities.

6. The computer-implemented method of claim 1, wherein the post-processing-based techniques are constructed to reduce at least one of cyclic battery aging and calendar battery aging.

7. A non-transitory article of manufacture tangibly embodying a computer readable program which when executed causes a computer to perform the steps of claim 1.

8. The computer-implemented method of claim 1, further comprising:
   constructing, by an Energy Management System (EMS), one or more optimization-based techniques for resilient battery charging based on an optimization problem having an EMS cost-based objective function, the one or more optimization-based techniques being constructed to include a battery degradation metric in the optimization problem such that the optimization problem includes a multi-objective function optimization problem including an the battery degradation metric is added as an additional objective function to the EMS cost-based objective function to alter the EMS cost-based objective function; and
   charging, by the EMS, one or more batteries in a power system in accordance with the one or more optimization-based techniques.

9. The computer-implemented method of claim 8, wherein the EMS cost-base objective function is formulated to minimize an EMS cost.

10. The computer-implemented method of claim 8, wherein said constructing step comprises:
    adding the battery degradation metric to the EMS cost-based objective function to alter the EMS cost-based objective function; and
    solving a new optimization problem, formulated to include the altered EMS cost-based objective function, as a multi-objective optimization.

11. The computer-implemented method of claim 8, wherein said constructing step comprises adding the battery degradation metric as a battery degradation cost to the EMS cost-based objective function to modify charging rates during charging events and idle times after charging events and discharging events relative to a state of the EMS cost-based objective function prior to adding the battery degradation cost.

12. The computer-implemented method of claim 11, wherein said adding step comprises:
    converting a battery degradation function into a cost function; and
    adding the cost function to the EMS cost-based objective function in the optimization problem.

13. The computer-implemented method of claim 8, wherein said constructing step comprises adding the battery degradation metric to the optimization problem by defining constraints for battery idle time and charging rates.

14. The computer-implemented method of claim 8, wherein the constraints are defined in order to decrease a battery degradation to a minimum without changing a current objective function in the EMS cost-based objective function.

15. The computer-implemented method of claim 8, wherein the one or more optimization-based techniques are constructed to mitigate at least one of cyclic battery aging and calendar battery aging.

16. A non-transitory article of manufacture tangibly embodying a computer readable program which when executed causes a computer to perform the steps of claim 8.

17. A system, comprising:
  an Energy Management System (EMS), having a processor and a memory operable coupled to the processor, the EMS configured to:
    constructing, by an Energy Management System (EMS), one or more post-processing-based techniques for resilient battery charging, the one or more post-processing-based techniques being constructed to modify an existing EMS battery profile for a given battery under management by the EMS, wherein one of the one or more post-process-based techniques includes formulating a stochastic approach based on a confidence interval and worst case scenario for the resilient battery charging to manipulate the existing EMS battery profile to achieve a lower amount of battery degradation of the given battery; and
    charge one or more batteries in a power system in accordance with the one or more optimization-based techniques.

18. The system of claim 17, wherein the EMS cost-based objective function is formulated to minimize an EMS cost.

* * * * *